United States Patent
Wada et al.

(10) Patent No.: US 8,463,525 B2
(45) Date of Patent: Jun. 11, 2013

(54) VARIABLE VALVE TIMING CONTROL APPARATUS AND METHOD FOR CONTROLLING VARIABLE VALVE TIMING DEVICE

(75) Inventors: Minoru Wada, Obu (JP); Masaomi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 470 days.

(21) Appl. No.: 12/826,999

(22) Filed: Jun. 30, 2010

(65) Prior Publication Data
US 2010/0332110 A1   Dec. 30, 2010

(30) Foreign Application Priority Data
Jun. 30, 2009   (JP) .................................. 2009-155846

(51) Int. Cl.
*F01L 9/02* (2006.01)
*F01L 9/00* (2006.01)

(52) U.S. Cl.
USPC ....................................... 701/102; 123/90.12

(58) Field of Classification Search
USPC ................... 701/101, 102; 123/90.12, 90.16, 123/90.17, 321, 345–348, 90.15, 90.31
See application file for complete search history.

(56) References Cited

U.S. PATENT DOCUMENTS

| 5,738,056 | A  | * | 4/1998  | Mikame et al. ............ 123/90.17 |
| 6,047,674 | A  | * | 4/2000  | Kadowaki et al. ......... 123/90.15 |
| 6,330,870 | B1 |   | 12/2001 | Inoue et al. |
| 6,505,586 | B1 |   | 1/2003  | Sato et al. |
| 2002/0100442 | A1 | | 8/2002 | Takahashi et al. |

FOREIGN PATENT DOCUMENTS
JP   2005-264764   9/2005

OTHER PUBLICATIONS
Japanese Office Action dated Aug. 8, 2011, issued in corresponding Japanese Application No. 2009-155846 with English Translation.

* cited by examiner

*Primary Examiner* — Mahmoud Gimie
(74) *Attorney, Agent, or Firm* — Nixon & Vanderhye PC

(57) ABSTRACT

A control device projects a lock pin to lock a VCT phase in an intermediate lock phase when a lock request occurs. A learning unit learns one of a most retarded phase, a most advanced phase, and an intermediate lock phase, as a reference phase. A control unit sets a target phase according to the reference phase and controls the control device. A monitor unit determines that the VCT phase has passed through the intermediate lock phase when the lock request occurs before completion of learning of the reference phase, and when a change in the VCT phase becomes greater than a threshold. The threshold is set to be greater than a sum of i) a design value of a phase difference between the intermediate lock phase and one of the most retarded phase and the most advanced phase and ii) a range of a product variation of the phase difference.

10 Claims, 10 Drawing Sheets

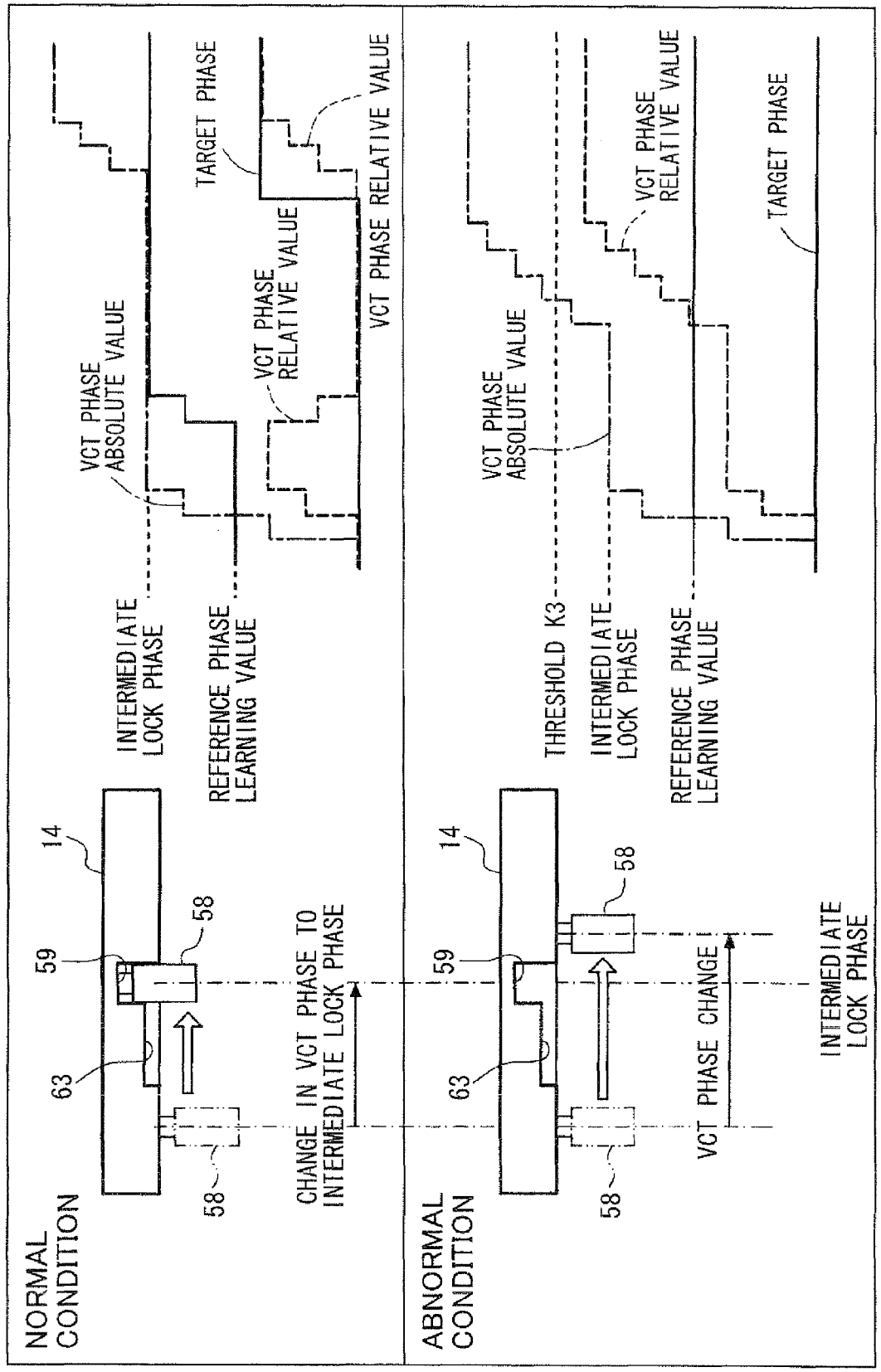

VARIABLE VALVE TIMING CONTROL APPARATUS AND METHOD FOR CONTROLLING VARIABLE VALVE TIMING DEVICE

CROSS REFERENCE TO RELATED APPLICATIONS

This application is based on and incorporates herein by reference Japanese Patent Application No. 2009-155846 filed on Jun. 30, 2009.

FIELD OF THE INVENTION

The present invention relates to a variable valve timing control apparatus for controlling a variable valve timing device for an internal combustion engine, the variable valve timing device having an intermediate lock mechanism configured to lock a rotation phase (henceforth "VCT phase") of a camshaft relative to a crankshaft of the internal combustion engine in an intermediate lock phase, which is located between a most retarded phase and a most advanced phase in a controllable range. The present invention relates to a method for controlling a variable valve timing device.

BACKGROUND OF THE INVENTION

Conventionally, each of Japanese unexamined patent application publication 9-324613 (corresponding to U.S. Pat. No. 5,738,056) and Japanese unexamined patent application publication 2001-159330 (corresponding to U.S. Pat. No. 6,330,870) has disclosed a variable valve timing device driven by a hydraulic pressure. Such a variable valve timing device is configured to set a lock phase to a substantially middle point of a controllable range of the VCT phase when an internal combustion engine is stopped thereby to increase the controllable range of the valve timing (VCT phase). Specifically, when the engine is stopped, the VCT phase is locked in the intermediate lock phase. The intermediate lock phase is set to be suitable for starting the engine. Subsequently, the engine in the intermediate lock phase is started. Thereafter, as an engine rotation speed increases to increase a rotation speed of an oil pump, a hydraulic pressure increases. After completion of starting of the engine, a hydraulic pressure is increased to a proper hydraulic pressure. Thus, the lock is released, and a feedback control of the VCT phase is started. A crank angle signal and a cam angle signal are respectively outputted from a crank angle sensor and a cam angle sensor, in synchronism with an engine rotation. At this time, an actual VCT phase is calculated based on a phase difference between a signal generation time point of the crank angle signal and a signal generation time point of the cam angle signal. After the lock is released, a hydraulic pressure for driving the variable valve timing device is feedback-controlled such that the actual VCT coincides with a target phase. The target phase is set according to an engine operation state.

As described in Japanese Patent publication 3699654, a most retarded phase or a most advanced phase is set to a reference phase (0° A) when the actual VCT phase and the target VCT phase are calculated. In such a variable valve timing device having an intermediate lock mechanism, the VCT phase is supposed to be locked in the intermediate lock phase when an engine is started. Therefore, when an abnormal condition occurs, and a lock pin is not properly projected to perform a locking action in response to a lock request, startability of the engine may be impaired, and stability of an idling operation after an engine start cannot be maintained. Therefore, when such an abnormal condition occurs, and when the lock pin cannot be properly projected, such an abnormal condition needs to be immediately detected.

However, each of components of the variable valve timing device has a variation in its physical property such as a dimension and the like due to a dimensional tolerance. Such a variation may be also caused by aging. Accordingly, a relationship between the actual VCT phase and the intermediate lock phase cannot be correctly determined before completion of learning of the reference phase. Therefore, when a lock request occurs in a period before completion of the learning of the reference phase, and when an abnormal condition occurs such that the lock pin is not properly projected, such an abnormal condition was hardly detected promptly. Furthermore, the engine is started in a condition where the VCT phase is locked in the intermediate lock phase. Therefore, subsequent to an engine start, it takes time before establishing an operating condition in which learning of the reference phase (most retarded phase or most advanced phase) can be performed. Accordingly, in a period after an engine start before completion of learning of the reference phase, the VCT phase is controlled while the reference phase is unknown. Consequently, the VCT phase is uncontrollable with a sufficient accuracy.

SUMMARY OF THE INVENTION

The present invention addresses the above disadvantage.

According to one aspect of the present invention, a variable valve timing control apparatus for a variable valve timing device for an internal combustion engine, the variable valve timing device driven by a hydraulic pressure and configured to change a VCT phase of a camshaft relative to a crankshaft to control a valve timing, the variable valve timing device including i) a lock pin configured to lock the VCT phase in an intermediate lock phase between a most retarded phase and a most advanced phase of a controllable range and ii) a hydraulic pressure control device configured to control a hydraulic pressure to drive the variable valve timing device and the lock pin, the variable valve timing control apparatus configured to control the hydraulic pressure control device to project the lock pin to lock the VCT phase in the intermediate lock phase when a lock request occurs, the variable valve timing control apparatus comprises a VCT phase calculating unit configured to calculate the VCT phase based on a phase difference between a time point, in which a crank angle sensor generates a crank angle signal at a predetermined crank angle with an operation of the internal combustion engine, and a time point, in which a cam angle sensor generates a cam angle signal at a predetermined cam angle with the operation of the internal combustion engine. The variable valve timing control apparatus further comprises a reference phase learning unit configured to learn one of the most retarded phase, the most advanced phase, and the intermediate lock phase, as a reference phase. The variable valve timing control apparatus further comprises a VCT phase control unit configured to set a target phase according to a learning value of the reference phase and configured to control the hydraulic pressure control device such that the VCT phase coincides with the target phase. The variable valve timing control apparatus further comprises a lock abnormality monitor unit configured to monitor a change in the VCT phase and determine that the VCT phase has passed through the intermediate lock phase when: i) the lock request occurs in a period before the reference phase learning unit completes learning of the reference phase; and ii) the monitored change in the VCT phase becomes greater than a threshold. The threshold is set to be greater than a sum of i) a design value of a phase difference between the intermediate lock phase and one of the most retarded phase and the most advanced phase and ii) a range of a product variation of the phase difference.

According to another aspect of the present invention, a variable valve timing control apparatus for a variable valve timing device for an internal combustion engine, the variable valve timing device driven by a hydraulic pressure and configured to change a VCT phase of a camshaft relative to a crankshaft to control a valve timing, the variable valve timing device including i) a lock pin configured to lock the VCT phase in an intermediate lock phase between a most retarded phase and a most advanced phase of a controllable range and ii) a hydraulic pressure control device configured to control a hydraulic pressure to drive the variable valve timing device and the lock pin, the variable valve timing control apparatus configured to control the hydraulic pressure control device to project the lock pin to lock the VCT phase in the intermediate lock phase when a lock request occurs, the variable valve timing control apparatus comprises a VCT phase calculating unit configured to calculate the VCT phase based on a phase difference between a time point, in which a crank angle sensor generates a crank angle signal at a predetermined crank angle with an operation of the internal combustion engine, and a time point, in which a cam angle sensor generates a cam angle signal at a predetermined cam angle with the operation of the internal combustion engine. The variable valve timing control apparatus further comprises a reference phase learning unit configured to learn one of the most retarded phase, the most advanced phase, and the intermediate lock phase, as a reference phase. The variable valve timing control apparatus further comprises a VCT phase control unit configured to set a target phase according to a learning value of the reference phase and configured to control the hydraulic pressure control device such that the VCT phase coincides with the target phase. When the lock request occurs in a period in which learning of the reference phase is not completed, the reference phase learning unit is configured to perform a provisional learning operation to i) select one phase from the most retarded phase, the most advanced phase, and the intermediate lock phase and ii) learn the selected one phase as a provisional reference phase.

According to another aspect of the present invention, a method for controlling a variable valve timing device for an internal combustion engine, the variable valve timing device driven by a hydraulic pressure to change a VCT phase of a camshaft relative to a crankshaft to control a valve timing, the variable valve timing device including i) a lock pin to lock the VCT phase in an intermediate lock phase between a most retarded phase and a most advanced phase of a controllable range and ii) a hydraulic pressure control device to control a hydraulic pressure to drive the variable valve timing device and the lock pin, the method comprises calculating the VCT phase based on a phase difference between a time point, in which a crank angle sensor generates a crank angle signal at a predetermined crank angle with an operation of the internal combustion engine, and a time point, in which a cam angle sensor generates a cam angle signal at a predetermined cam angle with the operation of the internal combustion engine. The method further comprises learning one of the most retarded phase, the most advanced phase, and the intermediate lock phase, as a reference phase. The method further comprises setting a target phase according to a learning value of the reference phase. The method further comprises controlling the hydraulic pressure control device such that the VCT phase coincides with the target phase. The method further comprises controlling the hydraulic pressure control device to control the hydraulic pressure to project the lock pin to lock the VCT phase in the intermediate lock phase when a lock request occurs. The method further comprises monitoring a change in the VCT phase and determining that the VCT phase has passed through the intermediate lock phase when: i) the lock request occurs in a period before completion of the learning of the reference phase; and ii) the monitored change in the VCT phase becomes greater than a threshold. The threshold is set to be greater than a sum of i) a design value of a phase difference between the intermediate lock phase and one of the most retarded phase and the most advanced phase and ii) a range of a product variation of the phase difference.

According to another aspect of the present invention, a method for controlling a variable valve timing device for an internal combustion engine, the variable valve timing device driven by a hydraulic pressure to change a VCT phase of a camshaft relative to a crankshaft to control a valve timing, the variable valve timing device including i) a lock pin to lock the VCT phase in an intermediate lock phase between a most retarded phase and a most advanced phase of a controllable range and ii) a hydraulic pressure control device to control a hydraulic pressure to drive the variable valve timing device and the lock pin, the method comprises calculating the VCT phase based on a phase difference between a time point, in which a crank angle sensor generates a crank angle signal at a predetermined crank angle with an operation of the internal combustion engine, and a time point, in which a cam angle sensor generates a cam angle signal at a predetermined cam angle with the operation of the internal combustion engine. The method further comprises learning one of the most retarded phase, the most advanced phase, and the intermediate lock phase, as a reference phase. The method further comprises setting a target phase according to a learning value of the reference phase. The method further comprises controlling the hydraulic pressure control device such that the VCT phase coincides with the target phase. The method further comprises controlling the hydraulic pressure control device to control the hydraulic pressure to project the lock pin to lock the VCT phase in the intermediate lock phase when a lock request occurs. The method further comprises performing a provisional learning operation to i) select one phase from the most retarded phase, the most advanced phase, and the intermediate lock phase and ii) learn the selected one phase as a provisional reference phase, when the lock request occurs before completion of the learning of the reference phase.

BRIEF DESCRIPTION OF THE DRAWINGS

The above and other objects, features and advantages of the present invention will become more apparent from the following detailed description made with reference to the accompanying drawings. In the drawings:

FIG. 6 includes an upper view and a lower view, the upper view explaining a VCT phase absolute value, a reference phase, a learning value, a VCT phase relative value, and a target phase when a VCT phase is changed from a most retarded phase to an intermediate lock phase and locked in a lock control in a normal condition, the lower view explaining the VCT phase absolute value, the reference phase, the learning value, the VCT phase relative value, and the target phase when the VCT phase passes through the intermediate lock phase without being locked in the lock control in an abnormal condition;

DETAILED DESCRIPTION OF PREFERRED EMBODIMENTS

As follows, first to third embodiments will be described.

First Embodiment

Figure 1:
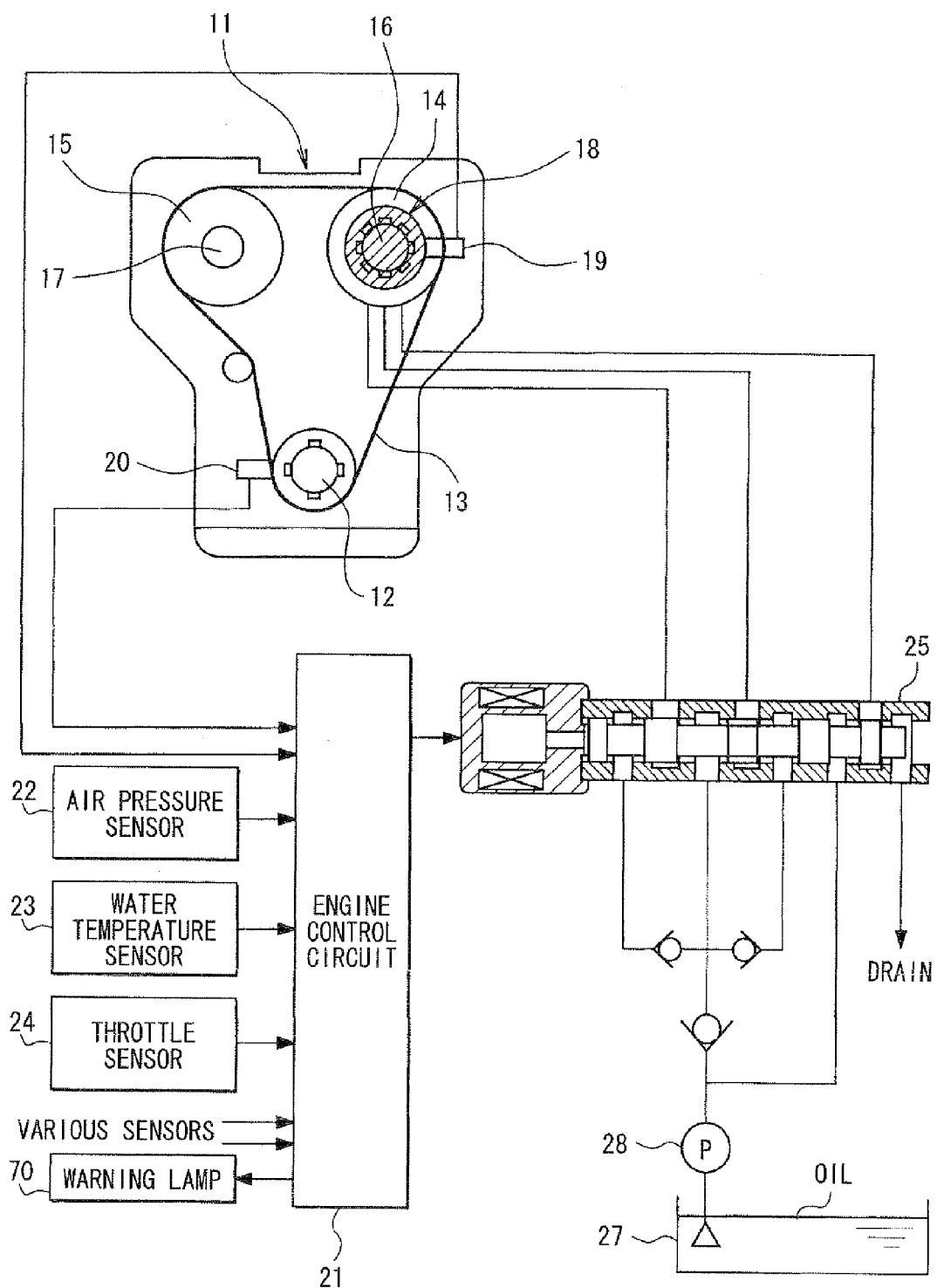
FIG. 1 is an overview showing an entire structure of an engine control system according to a first to third embodiments.

As follows, a first embodiment will be described with reference to FIGS. 1 to 7. As shown in FIG. 1, in an internal combustion engine 11, an output power of a crankshaft 12 is transmitted to an intake-side camshaft 16 and an exhaust-side camshaft 17 via sprockets 14, 15 and a timing chain 13. The intake-side camshaft 16 is provided with a variable valve timing device 18 (variable cam timing: VCT) for controlling an advance (VCT phase) of the intake-side camshaft 16 relative to the crankshaft 12.

A cam angle sensor 19 is provided on the outer circumferential periphery side of the intake-side camshaft 16 to output a pulse of a cam angle signal at a predetermined cam angle interval. A crank angle sensor 20 is provided on the outer circumferential periphery side of the crankshaft 12 to output a pulse of a crank angle signal at a predetermined crank angle interval. The output signals of the cam angle sensor 19 and the crank angle sensor 20 are inputted to an engine control circuit 21. The engine control circuit 21 functions as a VCT phase calculating unit. The engine control circuit 21 calculates an actual valve timing (actual VCT phase) of an intake valve based on a phase difference between the pulses of the output signals of the cam angle sensor 19 and the crank angle sensor 20. The engine control circuit 21 calculates an engine speed based on a frequency (pulse interval) of the output pulse of the crank angle sensor 20. The engine control circuit 21 further inputs output signals of various sensors to detect an engine operation state. The various sensors include an intake air pressure sensor 22, a cooling water temperature sensor 23, a throttle sensor 24, and the like.

The engine control circuit 21 performs a fuel injection control and an ignition control according to the engine operation state detected by using the various sensors. The engine control circuit 21 further performs a variable valve timing control (VCT phase feedback control). Specifically, the engine control circuit 21 performs a feedback control of a hydraulic pressure to drive the variable valve timing device 18 such that an actual valve timing (actual VCT phase) of the intake valve coincides with a target valve timing (target VCT phase) according to the engine operation state.

Subsequently, a structure of the variable valve timing device 18 will be described with reference to FIGS. 2 to 4. A housing 31 of the variable valve timing device 18 is screwed and fixed to the sprocket 14 with a bolt 32. The sprocket 14 is supported rotatably on the outer periphery of the intake-side camshaft 16. In this structure, rotation of the crankshaft 12 is transmitted to the sprocket 14 and the housing 31 via the timing chain 13, so that the sprocket 14 and the housing 31 rotate in synchronism with the crankshaft 12.

A rotor 35 is screwed and fixed to one end of the intake-side camshaft 16 with a bolt 37. The rotor 35 is rotatably accommodated in the housing 31. As shown in FIG. 3, multiple vane accommodation chambers 40 are formed in the housing 31. Each of the vane accommodation chambers 40 is partitioned into an advance chamber 42 and a retard chamber 43 by a vane 41, which is formed in the outer circumferential periphery of the rotor 35. One of the vanes 41 has both sides provided with a stopper portion 56 for restriction of a movable range of the rotor 35 (vane 41) relative to the housing 31. Specifically, the stopper portion 56 restricts an aftermost retard angle position and a foremost advance angle position in an adjustable range of the actual VCT phase (camshaft phase).

The variable valve timing device 18 includes an intermediate lock mechanism 50 to lock the VCT phase in an intermediate lock phase located between a most retarded phase and a most advanced phase in the adjustable range. The intermediate lock phase is, for example, located substantially at a middle position between the most retarded phase and the most advanced phase. As follows, a structure of the intermediate lock mechanism 50 will be described. A lock pin accommodation hole 57 is provided in at least one of the vanes 41. A lock pin 58 is accommodated in the lock pin accommodation hole 57. The lock pin 58 can be projected for locking a relative rotation between the housing 31 and the rotor 35 (vane 41). As shown in FIG. 4, the lock pin 58 is projected toward the sprocket 14 and fitted into a lock hole 59 of the sprocket 14. Thereby, a VCT phase is locked in the intermediate lock phase located at a substantially middle position in an adjustable range. The intermediate lock phase is set to a phase suitable for starting the engine 11. The lock hole 59 may be provided in the housing 31.

Figure 4:
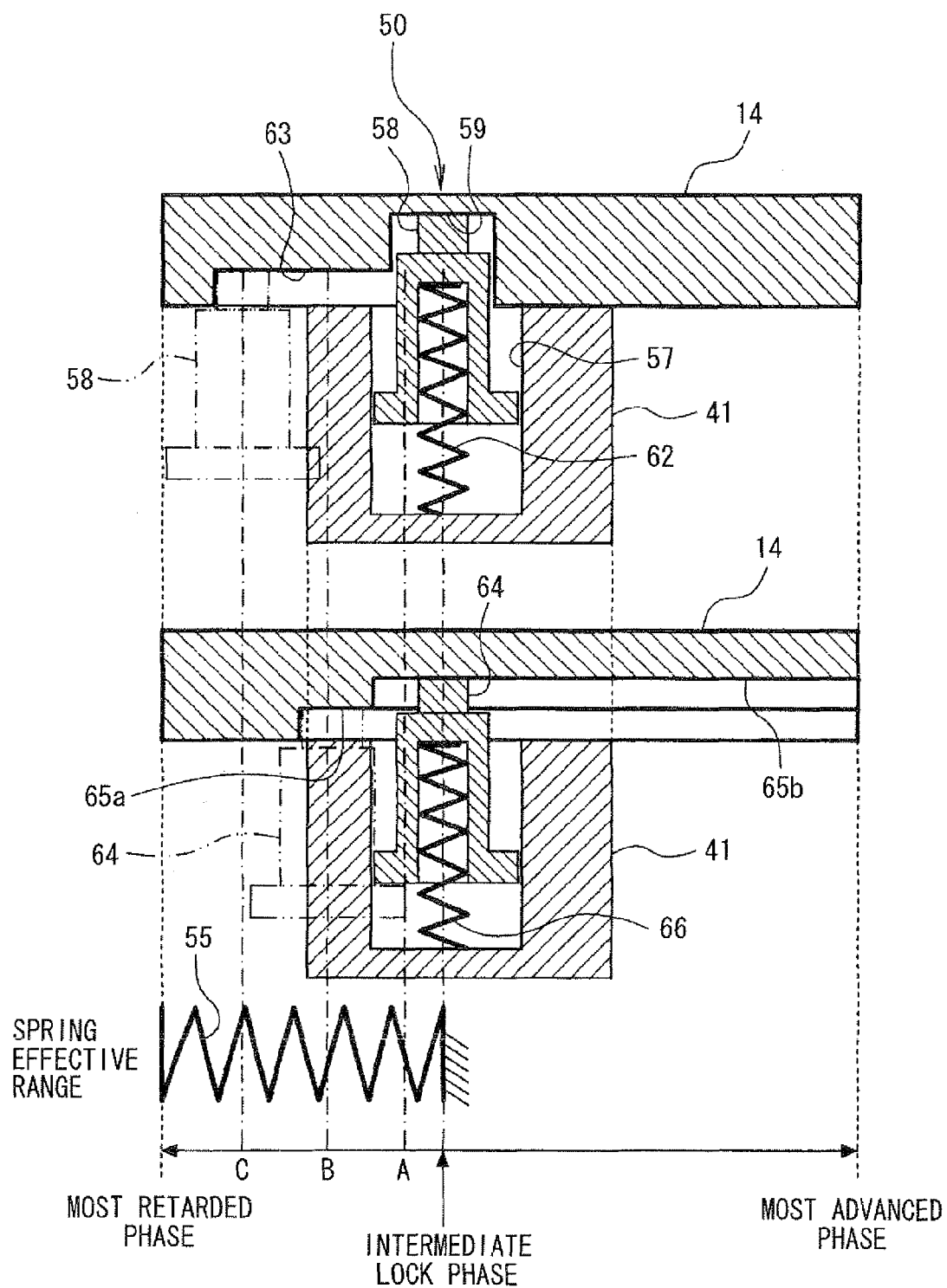
FIG. 4 is an explanatory view showing an advance restriction pin and a retard restriction pin.

Referring to FIG. 4, the lock pin 58 is biased from a spring 62 in a lock direction (projection direction). The outer circumferential periphery of the lock pin 58 and the lock pin accommodation hole 57 form a hydraulic pressure chamber therebetween. Specifically, the hydraulic pressure chamber is formed for controlling a hydraulic pressure to drive the lock pin 58 in a lock release direction.

In the present first embodiment, the lock pin 58 also functions as an advance restriction pin to restrict the VCT phase, which is controlled on the retard side relative to the intermediate lock phase, from unintentionally moving to the advance side beyond the intermediate lock phase. An advance restriction groove 63 is formed continuously with the lock hole 59 to have a shallow bottom surface relative to the lock hole 59. The advance restriction groove 63 extends to a predetermined phase C near the most retarded phase. The lock pin 58 (advance restriction pin) is fitted into the advance restriction groove 63. Thereby, a range of the VCT phase controlled on the retard side relative to the intermediate lock phase is restricted in a range between the intermediate lock phase and the predetermined phase C near the most retarded phase.

When the target phase is set on the most retarded phase side beyond the predetermined phase C, the lock pin 58 (advance restriction pin) is retracted from the advance restriction groove 63 by applying a hydraulic pressure. Thereby, the VCT phase is enabled to change toward the most retarded phase side. When the target phase is set on the advance side beyond the intermediate lock phase, the lock pin 58 (advance restriction pin) is completely retracted from the lock hole 59 by applying a hydraulic pressure. Thereby, the VCT phase is enabled to change toward the advance side beyond the intermediate lock phase.

Similarly, a retard restriction pin 64 and two steps of retard restriction grooves 65a, 65b are provided to restrict the VCT phase, which is controlled on the advance side, from unintentionally changing toward the retard side. The retard restriction pin 64 is biased from the spring 66 and fitted into one of the retard restriction grooves 65a, 65b. Thereby, the range of the VCT phase controlled on the advance side is restricted in two steps.

It is noted that one of the two-step retard restriction grooves 65a, 65b may be omitted to form a one-step retard restriction groove. Alternatively, three or more steps of retard restriction grooves may be formed. The advance restriction groove 63, the retard restriction grooves 65a, 65b, and the retard restriction pin 64 may be omitted.

In the example of FIG. 4, the retard restriction grooves 65a, 65b respectively extend from the most advanced phase to a predetermined phases B, A on the retard side beyond the intermediate lock phase. Therefore, in the intermediate lock phase, the lock pin 58 (advance restriction pin) and the retard restriction pin 64 are respectively fitted into the lock hole 59 and the retard restriction groove 65b, which is the deeper groove in the second step.

Figure 2:
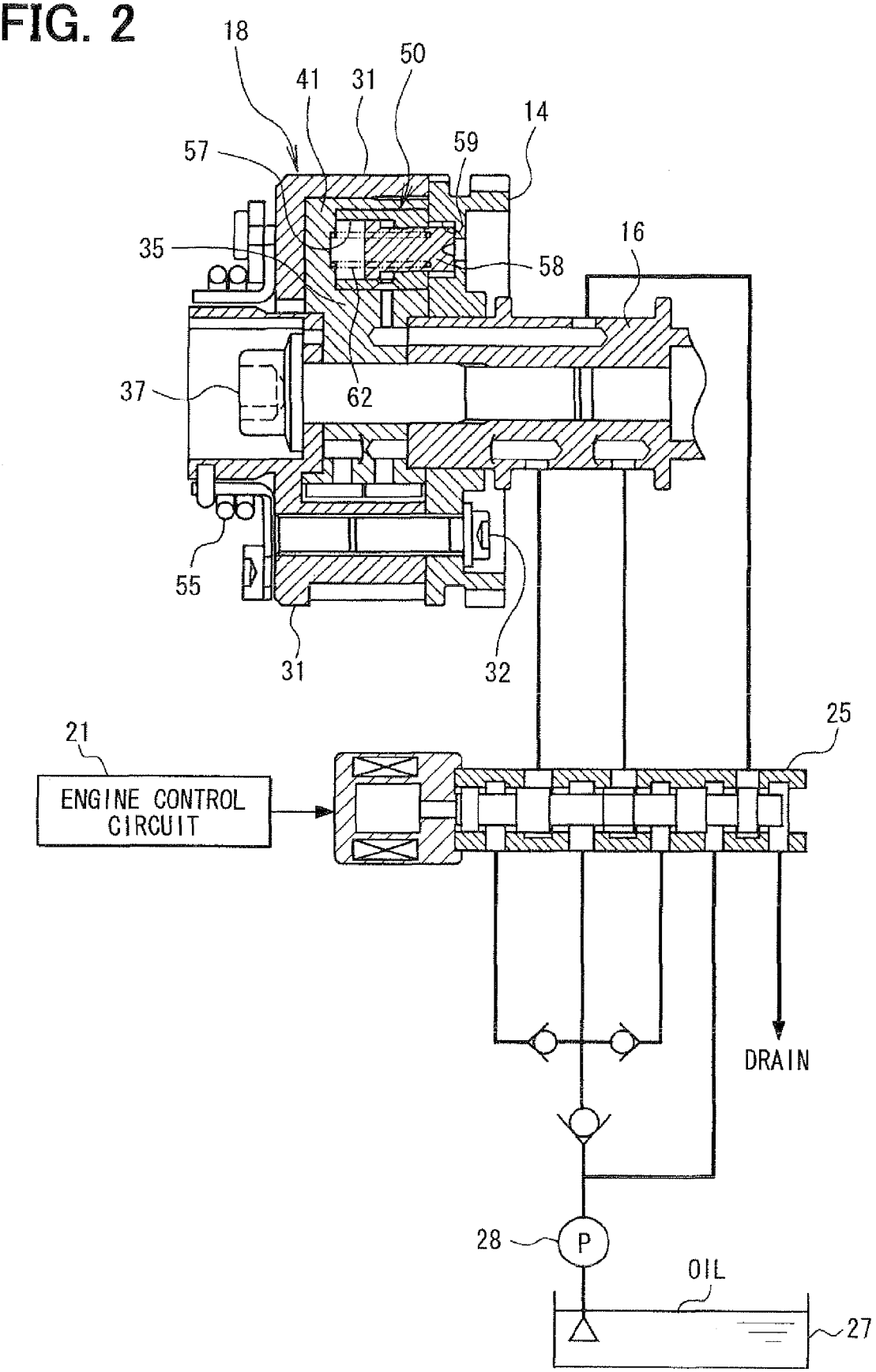
FIG. 2 is a sectional view showing a variable valve timing device and a hydraulic pressure control circuit.
Figure 3:
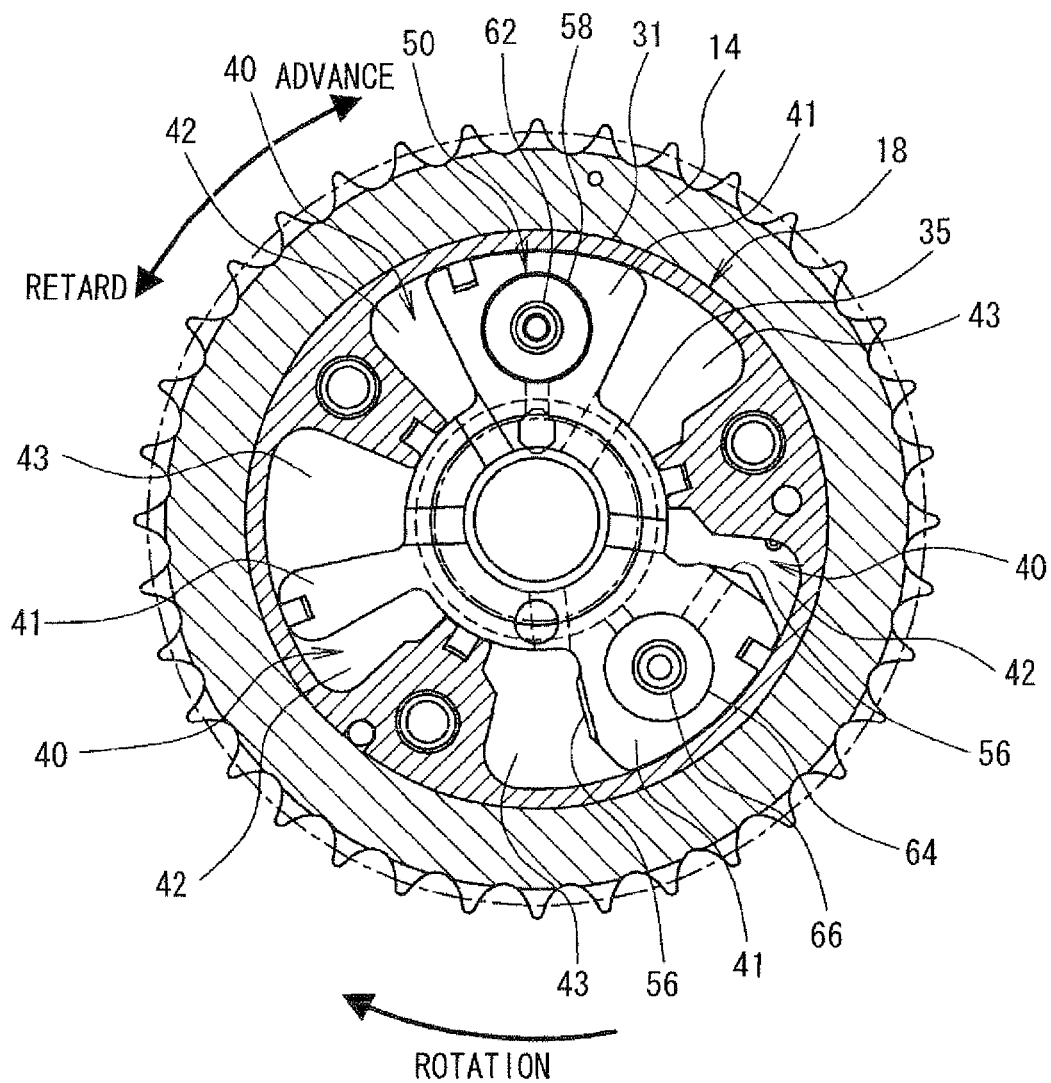
FIG. 3 is a sectional view showing the variable valve timing device.

As shown in FIG. 2, a spring 55, such as a torsion coil spring, is provided in the housing 31. The spring 55 functions as a bias unit to apply a spring force so as to assist a hydraulic pressure, which acts to rotate the rotor 35 relative to the housing 31 in the advance direction when the advance control is performed. In the variable valve timing device 18 for an intake valve, a torque of the intake-side camshaft 16 works in a direction to retard the VCT phase. Therefore, the spring 55 applies a bias force to change the VCT phase in the advance direction, which is opposite to a direction in which a torque of the intake-side camshaft 16 works.

In the present first embodiment, as shown in FIG. 4, a biasing force of the spring 55 is effective in a range from the most retarded phase to a substantially intermediate lock phase. It is supposed that a clanking operation of the engine is performed by a starter (not shown) when the engine is in an actual VCT phase on the retard side relative to the intermediate lock phase in a condition where the lock pin 58 is detached from the lock hole 59. In consideration of a fail safe operation in such a re-starting of the engine after an irregular stop such as an engine stole, the spring 55 applies a spring force to assist an advance operation so as to advance the actual VCT phase from the retard side to the intermediate lock phase. Thereby, the lock pin 58 is fitted into the lock hole 59 to lock the rotation phase.

On the other hand, when the engine is in the actual VCT phase on the advance side relative to the intermediate lock phase, and when the engine is started, a torque of the intake-side camshaft 16 works in the retard direction during a clanking operation. Therefore, a torque of the intake-side camshaft 16 is applied to retard the actual VCT phase from the advance side to the intermediate lock phase. Thus, the lock pin 58 can be fitted into the lock hole 59, and the rotation phase can be locked.

Figures 5A, 5B:
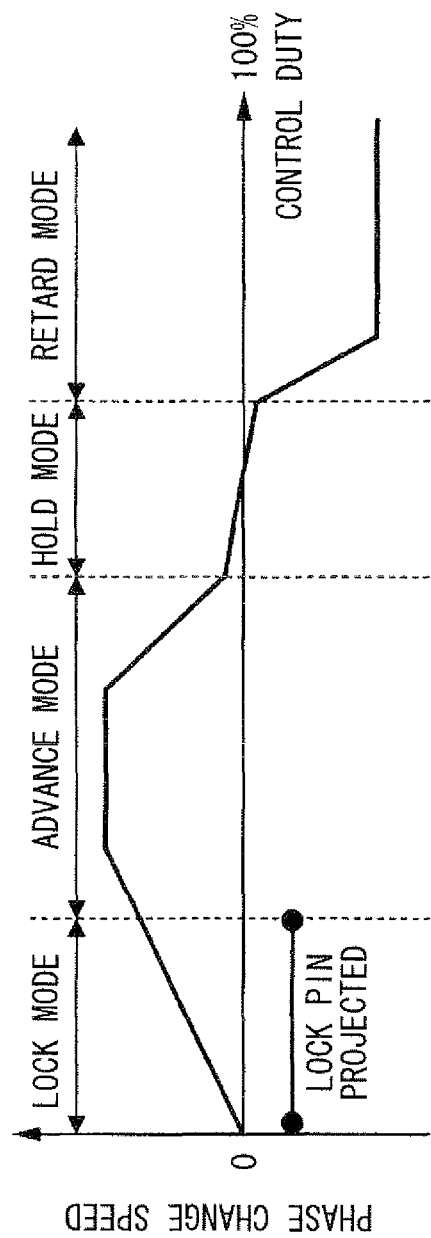
FIG. 5A is a view explaining switch patterns of an advance port, a retard port, and a lock pin control port including states of close, supply hold, drain of a hydraulic pressure control valve.
FIG. 5B is a graph explaining a control characteristic including a relationship between a phase change speed and four control regions including a lock mode, an advance mode, a hold mode, and a retard mode in the hydraulic pressure control valve.

In the present first embodiment, the hydraulic pressure control device controls a hydraulic pressure to drive the VCT phase of the variable valve timing device 18, the lock pin 58, and the retard restriction pin 64. The hydraulic pressure control device includes a hydraulic pressure control valve 25 having an integrated hydraulic pressure control valve functions for a phase control and a lock control. The hydraulic pressure control valve function is to perform a phase control to control a hydraulic pressure so as to drive the VCT phase. The hydraulic pressure control valve function is to perform a lock control to control a hydraulic pressure so as to drive the lock pin 58. An oil pump 28 is applied with an output power of the engine 11 and driven to draw oil (working fluid) from the oil sump 27 to the hydraulic pressure control valve 25. The hydraulic pressure control valve 25 includes a spool valve having eight ports and movable in four positions, for example. As shown in FIGS. 5A, 5B, the hydraulic pressure control valve 25 has four control regions including a lock mode (light advance mode), an advance mode, a hold mode, and a retard mode. The spool valve is set in one of the four control regions according to a control duty (control quantity) of the hydraulic pressure control valve 25.

In the control region of the lock mode (light advance mode), a lock pin control port of the hydraulic pressure control valve 25 is communicated with a drain port to reduce a hydraulic pressure in the lock-release hydraulic pressure chamber formed in the lock pin accommodation hole 57. Thus, the lock pin 58 biased from the spring 62 is moved in the lock direction (projection direction). In addition, a retard port is communicated with the drain port to reduce a hydraulic pressure in the retard chamber 43. In such a condition, a throttle in a passage of the advance port of the hydraulic pressure control valve 25 is gradually changed according to a control duty of the hydraulic pressure control valve 25. Thus, oil is gradually supplied from the advance port into the advance chamber 42 so as to gently change the actual VCT phase in the advance direction.

In the control region of the advance mode, the drain port is communicated with the retard port in the hydraulic pressure control valve 25 so as to reduce a hydraulic pressure in the retard chamber 43. In such a condition, a hydraulic pressure applied from the advance port of the hydraulic pressure control valve 25 into the advance chamber 42 is changed according to a control duty of the hydraulic pressure control valve 25. Thus, the actual VCT phase is advanced.

In the control region of the hold mode, a hydraulic pressure in both the advance chamber 42 and the retard chamber 43 is maintained to hold the actual VCT phase. In the control region of the retard mode, the drain port is communicated with the advance port in the hydraulic pressure control valve 25 so as to reduce a hydraulic pressure in the advance chamber 42. In such a condition, a hydraulic pressure applied from the retard port of the hydraulic pressure control valve 25 into the retard chamber 43 is changed according to a control duty of the hydraulic pressure control valve 25. Thus, the actual VCT phase is retarded.

In a control region other than the lock mode, that is, in the retard mode, the hold mode, and the advance mode, oil is charged into the lock-release hydraulic pressure chamber in the lock pin accommodation hole 57 so as to increase a hydraulic pressure in the lock-release hydraulic pressure chamber. Thus, the lock pin 58 applied with a hydraulic pressure is retracted from the lock hole 59 to release the lock of the lock pin 58.

In the present first embodiment, the control mode is changed in the order of the lock mode (light advance mode), the advance mode, the hold mode, and the retard mode, as a control duty of the hydraulic pressure control valve 25 becomes large. Alternatively, the control mode may be changed in the order of, for example, the retard mode, the hold mode, the advance mode, and the lock mode (light advance mode), as the control duty of the hydraulic pressure control valve 25 becomes large. Alternatively, the order of the retard mode and the advance mode may be exchanged. Specifically, the control mode may be changed in the order of the lock mode (light advance mode), the retard mode, the hold mode, and the advance mode. As follows, it is supposed that the control region of the lock mode (light advance mode) continues with the control region of the retard mode. In this case, in the control region of the lock mode (light advance mode), a hydraulic pressure in the lock-release hydraulic pressure chamber of the lock pin accommodation hole 57 is reduced to move the lock pin 58 biased from the spring 62 in the lock direction (projection direction). Further, the drain port is communicated with the advance port to reduce a hydraulic pressure in the advance chamber 42. In such a condition, the throttle in the passage of the retard port is gradually changed according to a control duty of the hydraulic pressure control valve 25 so as to gradually supply oil from the retard port into the retard chamber 43. In this manner, the actual VCT phase may be gently changed in the retard direction.

The engine control circuit 21 functions as a VCT phase control unit to perform a feedback control (F/B control) of a hydraulic pressure. Specifically, the engine control circuit 21 performs a VCT phase F/B control (variable valve timing control) to set a target phase (target valve timing) relative to a reference phase according to an engine operation condition, such that the actual VCT phase of the intake-side camshaft 16 coincides with a target phase (target valve timing). The actual VCT phase of the intake-side camshaft 16 corresponds an actual valve timing of the intake valve. More specifically, the engine control circuit 21 performs, for example, a PD (proportional-derivative) control of a control duty (control quantity) of the hydraulic pressure control valve 25 so as to feedback control a hydraulic pressure applied in the advance chamber 42 and the retard chamber 43 of the variable valve timing device 18. The wording of F/B means a feedback.

Further, the engine control circuit 21 controls the hydraulic pressure control valve 25 to perform a lock control (control in the lock mode) when an operation of the engine 11 is being stopped, and a lock request is caused. In the lock control, the engine control circuit 21 changes the VCT phase toward the intermediate lock phase and projects the lock pin 58 to lock the VCT phase in the intermediate lock phase.

In the present structure, when the engine 11 is stopped, the lock control is performed to project the lock pin 58. In the lock control, when the lock pin 58 is normally projected to lock the VCT phase in the intermediate lock phase, the engine 11 in the intermediate lock phase can be started in the subsequent engine start. Therefore, a startability of the engine 11 can be secured in the subsequent engine start. On the contrary, in an abnormal condition such as a state, in which the lock pin 58 is not normally projected, a locking operation cannot be properly carried out. Consequently, startability of the engine 11 cannot be properly secured, and stability of an idling operation may be impaired. Therefore, when an abnormal condition occurs, and when the lock pin 58 cannot be normally projected, such an abnormal condition needs to be immediately detected.

However, each of components of the variable valve timing device 18 has a variation in its physical property such as a dimension and the like due to a dimensional tolerance. Such a variation may be also caused by aging. Accordingly, the relationship between the actual VCT phase and the intermediate lock phase also has a variation. Therefore, the relationship between the actual VCT phase and the intermediate lock phase cannot be correctly determined before learning of a reference phase is completed. The reference phase is a reference of a VCT phase feedback control. The reference phase is, in general, the most retarded phase. Conventionally, when a lock request occurs in a period before the learning of the reference phase is completed, and when an abnormal condition occurs such that the lock pin 58 is not normally projected, such an abnormal condition was hardly detected promptly.

In view of such a problem, in the present first embodiment, the engine control circuit 21 monitors a change in the VCT phase when a lock request occurs before completion of learning of the reference phase. The engine control circuit 21 determines that the VCT phase passes through the intermediate lock phase when the change in the VCT phase becomes greater than a threshold K3. The threshold K3, which is to be compared with the change in the VCT phase, is set to be greater than a design value of a phase difference between the most retarded phase and the intermediate lock phase by a range of a product variation in the phase difference.

Even in a period before completion of learning of the reference phase, the change in the VCT phase can be correctly calculated based on output signals of the crank angle sensor 20 and the cam angle sensor 19. In consideration of such a premise, in the present first embodiment, when a lock request occurs before completion of learning of the reference phase, the engine control circuit 21 monitors a change in the VCT phase after occurrence of the lock request. The engine control circuit 21 determines that the VCT phase passes through the intermediate lock phase when the change in the VCT phase after occurrence of the lock request becomes greater than a threshold K3. It is noted that, the threshold K3 is set to be greater than the design value of the phase difference between the most retarded phase and the intermediate lock phase by a range of a product variation of the phase difference. Therefore, it can be correctly determined whether the VCT phase passes through the intermediate lock phase according to a determination whether the change in the VCT phase after occurrence of the lock request becomes greater than the threshold K3.

Subsequently, one example of a lock control when a lock request occurs on the retard side relative to the intermediate lock phase will be described with reference to FIG. 6. The upper view of FIG. 6 shows a behavior of an absolute value of the VCT phase, a relative value of the VCT phase, a target phase, and a reference phase learning value (intermediate lock phase learning value) in a normal condition. In the normal condition, the lock pin 58 is normally projected in response to a lock request, and the VCT phase is locked in the intermediate lock phase. The lower view of FIG. 6 shows a behavior of an absolute value of the VCT phase, a relative value of the VCT phase, a target phase, and the intermediate lock phase learning value in an abnormal condition. In the abnormal condition, the VCT phase passes toward the retard side through the intermediate lock phase without projection of the lock pin 58.

In the example of FIG. 6, the intermediate lock phase is used as the reference phase. Alternatively, the most retarded phase or the most advanced phase may be used as the reference phase. The VCT phase absolute value is a VCT phase calculated from the phase difference between the output signals of the cam angle sensor 19 and the crank angle sensor 20. The VCT phase relative value is calculated by subtracting the reference phase learning value from the VCT phase absolute value. That is, the VCT phase relative value is a change in the VCT phase relative to the reference phase learning value.

VCT phase relative value=VCT phase absolute value−
reference phase learning value The target phase is also set relative to the reference phase learning value. The reference phase learning value is maintained at its initial value or a previous learning value, before completion of learning of the reference phase.

As shown in the upper view of FIG. 6, a lock request occurs on the retard side relative to the intermediate lock phase. In such a case, when the lock pin 58 is normally projected to lock the VCT phase in the intermediate lock phase, a change in the VCT phase after occurrence of the lock request does not become greater than a phase difference between the most retarded phase and the intermediate lock phase. In this case, the change in the VCT phase absolute value is the same as the change in the VCT phase relative value.

On the contrary, as shown in the lower view of FIG. 6, a lock request occurs on the retard side relative to the intermediate lock phase. In such a case, when the lock pin 58 is not projected, and when the VCT phase passes toward the retard side through the intermediate lock phase, a change in the VCT phase after occurrence of the lock request may become greater than the phase difference between the most retarded phase and the intermediate lock phase.

It is noted that, the phase difference between the most retarded phase and the intermediate lock phase is varied according to a product variation caused when the product is manufactured or caused due to aging. In view of such a subject, in the present first embodiment, the threshold, which is to be compared with the change in the VCT phase, is set to be greater than the design value of the phase difference between the most retarded phase and the intermediate lock phase by a range of a product variation in the phase difference. In this manner, it can be correctly determined whether the VCT phase has passed through the intermediate lock phase according to a determination whether the change in the VCT phase is greater than the threshold.

Figure 7:
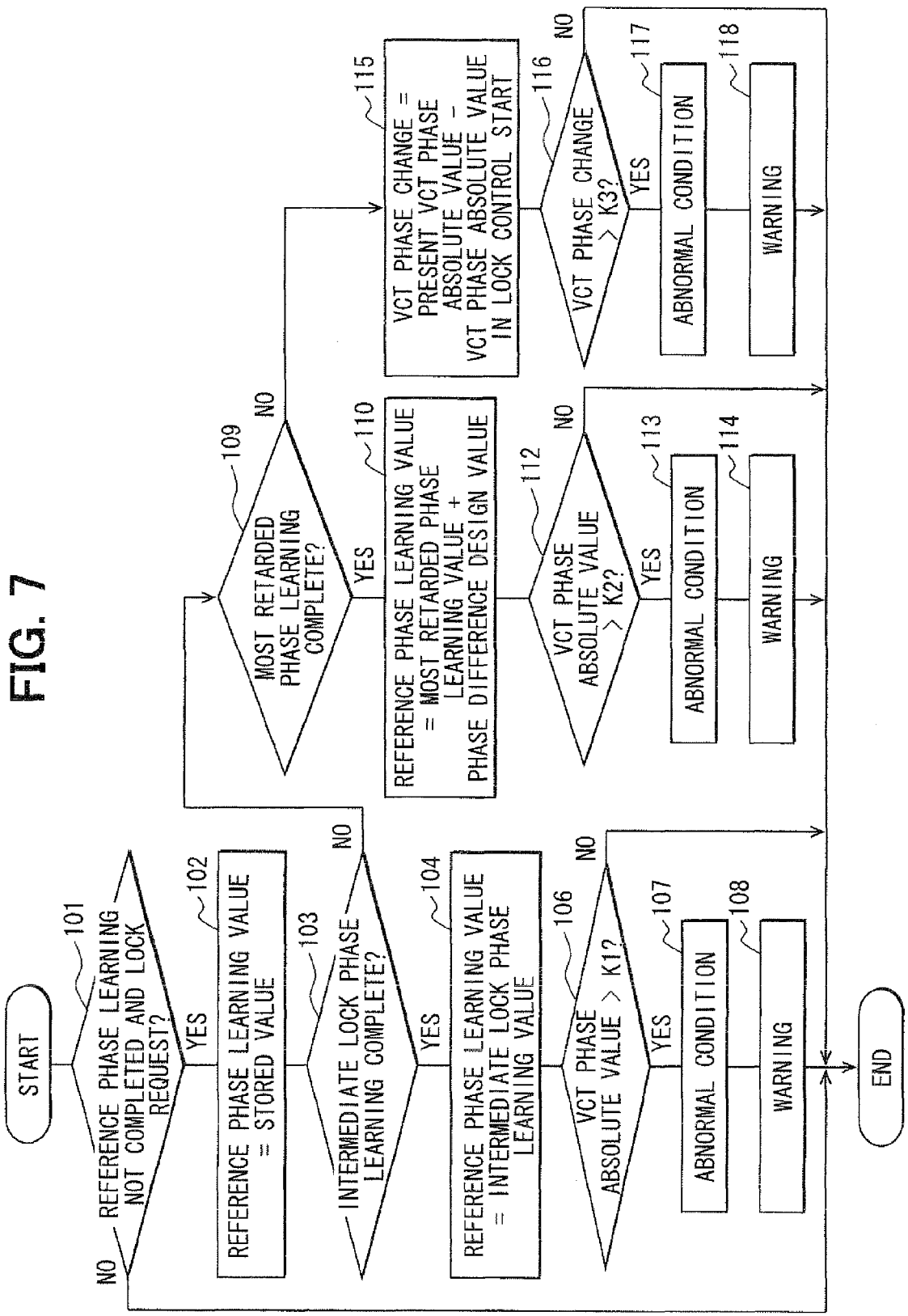
FIG. 7 is a flow chart explaining an operation of an intermediate-lock-phase-pass-through determination processing according to the first embodiment.

The above-described intermediate-lock-phase-pass-through determination operation according to the present embodiment 1 is performed by the engine control circuit 21 by executing an intermediate-lock-phase-pass-through determination processing of FIG. 7. The intermediate-lock-phase-pass-through determination processing of FIG. 7 is repeatedly executed at a predetermined interval in a period in which the engine control circuit 21 is supplied with electric power and activated after the ignition switch is turned ON (activated). The intermediate-lock-phase-pass-through determination processing of FIG. 7 functions as a reference phase learning unit and a lock abnormality monitor unit.

When the present processing is started, at step 101, it is first determined whether learning of the reference phase is not completed, and it is determined whether a lock request is caused. When learning of the reference phase is already completed, or when a lock request is not caused, the present processing is terminated without execution of subsequent processings.

Alternatively, at step 101, when it is determined that learning of the reference phase is not completed, and when it is determined that a lock request is caused, the processing proceeds to step 102. At step 102, a previous reference phase learning value stored in a backup RAM of the engine control circuit 21 is provisionally set as a reference phase learning value. The backup RAM of the engine control circuit 21 is, for example, a rewritable nonvolatile memory configured to hold memory data when the engine control circuit 21 is not supplied with electricity. When a previous reference phase learning value is not stored, a design value of the reference phase is provisionally set as an initial value of reference phase learning value.

Subsequently, the processing proceeds to step 103, at which it is determined whether learning of the intermediate lock phase is completed. When it is determined that learning of the intermediate lock phase is already completed, the processing proceeds to step 104. At step 104, the learning value of the intermediate lock phase is set as the reference phase learning value, and the presently set reference phase learning value is stored in the backup RAM. Thus, the reference phase learning value is updated.

Subsequently, the processing proceeds to step 106, at which it is determined whether the present VCT phase absolute value is greater than the threshold K1. That is, it is determined whether the present VCT phase absolute value is on the advance side relative to the phase corresponding to the threshold K1. The VCT phase absolute value is a VCT phase calculated based on the phase difference between the output signals of the cam angle sensor 19 and the crank angle sensor 20. The threshold K1 is set on the advance side by a VCT phase detection error relative to the intermediate lock phase learning value (reference phase learning value).

threshold $K1$=intermediate lock phase learning value+
equivalence of VCT phase detection error At step 106, when it is determined that the present VCT phase absolute value is greater than the threshold K1 to be on the advance side, the processing proceeds to step 107. At step 107, it is determined to be an abnormal condition, in which the lock pin 58 is not normally projected, and the VCT phase has passed through the intermediate lock phase. At next step 108, a warning lamp 70 (warning unit: FIG. 1) is activated to be lit or blinked so as to warn a driver. Alternatively, an alarm message may be indicated on a display unit in an instrument panel of a driver seat. In addition or alternatively, an alarm sound may be caused to warn a driver.

At step 106, when it is determined that the VCT phase absolute value is less than or equal to the threshold K1 to be on the retard side, the processing is terminated without execution of subsequent steps.

On the other hand, when it is determined that learning of the intermediate lock phase is not completed at step 103, the processing proceeds to step 109. At step 109, it is determined whether learning of the most retarded phase is completed. When learning of the most retarded phase is already completed, the processing proceeds to step 110. At step 110, the phase difference design value is added to the most retarded phase learning value stored in the backup RAM, and the reference phase learning value is obtained. Thus, the obtained reference phase learning value is stored in the backup RAM and updated.

reference phase learning value=most retarded phase
learning value+phase difference design value The phase difference design value is a design value of the phase difference between the intermediate lock phase and the most retarded phase.

Subsequently, the processing proceeds to step 112, at which it is determined whether the present VCT phase absolute value is greater than a threshold K2. That is, it is determined whether the present VCT phase absolute value is on the advance side relative to the phase corresponding to the threshold K2. The threshold K2 is set on the advance side relative to the reference phase learning value by a total value of i) a range of a product variation in the phase difference between the intermediate lock phase and the most retarded phase and ii) an equivalence of the VCT phase detection error.

threshold $K2$=reference phase learning value+product variation range in phase difference+equivalence of VCT phase detection error At step 112, when it is determined that the present VCT phase absolute value is greater than the threshold K2 to be on the advance side, the processing proceeds to step 113. At step 113, it is determined to be an abnormal condition, in which the lock pin 58 is not normally projected, and the VCT phase has passed through the intermediate lock phase. At next step 114, the warning lamp 70 is activated to be lit or blinked so as to warn a driver, in addition or alternatively, an alarm message may be indicated on a display unit in an instrument panel of a driver seat. In addition or alternatively, an alarm sound may be caused to warn a driver. At step 112, when it is determined that the present VCT phase absolute value is less than or equal to the threshold K2 to be on the retard side, the processing is terminated without execution of subsequent steps.

On the other hand, when it is determined that learning of the most retarded phase is not completed at step 109, the processing proceeds to step 115. At step 115, the VCT phase absolute value at the time of a lock control start (initial state of occurrence of a lock request) is subtracted from the present VCT phase absolute value to obtain a VCT phase change from the lock control start to the present state.

VCT phase change to the present state=present VCT phase absolute value−VCT phase absolute value in lock control start Subsequently, the processing proceeds to step 116, at which it is determined whether the VCT phase change to the present state is greater than a threshold K3 to be of the advance side. The threshold K3 is set to be greater than a design value of the phase difference between the intermediate lock phase and the most retarded phase by a total value of a range of a product variation in the phase difference and an equivalence of the VCT phase detection error.

threshold $K3$=phase difference design value+product variation range in phase difference+equivalence of VCT phase detection error At step 116, when it is determined that the VCT phase change to the present state is greater than the threshold K3 to be on the advance side, the processing proceeds to step 117. At step 117, it is determined to be an abnormal condition, in which the lock pin 58 is not normally projected, and the VCT phase has passed through the intermediate lock phase. At next step 118, the warning lamp 70 is activated to be lit or blinked so as to warn a driver. In addition or alternatively, an alarm message may be indicated on a display unit in an instrument panel of a driver seat. In addition or alternatively, an alarm sound may be caused to warn a driver. At step 116, when it is determined that the VCT phase change to the present state is less than or equal to the threshold K3 to be on the retard side, the processing is terminated without execution of subsequent steps.

According to the above-described present first embodiment, when a lock request occurs in a period in which learning of the reference phase has not been completed, change in the VCT phase after occurrence of the lock request is monitored. When the change in the VCT phase after the occurrence of the lock request becomes greater than the threshold K3, it is determined that the VCT phase has passed through the intermediate lock phase. In this manner, it can be correctly determined whether the VCT phase has passed through the intermediate lock phase according to a determination whether the change in the VCT phase after the occurrence of the lock request becomes greater than the threshold K3. In this manner, an abnormal condition in which the lock pin 58 is not normally projected can be promptly detected. Thus, a driver can be promptly warned about such an abnormal condition by lighting the warning lamp 70 and/or the like.

Second Embodiment

Figure 8:
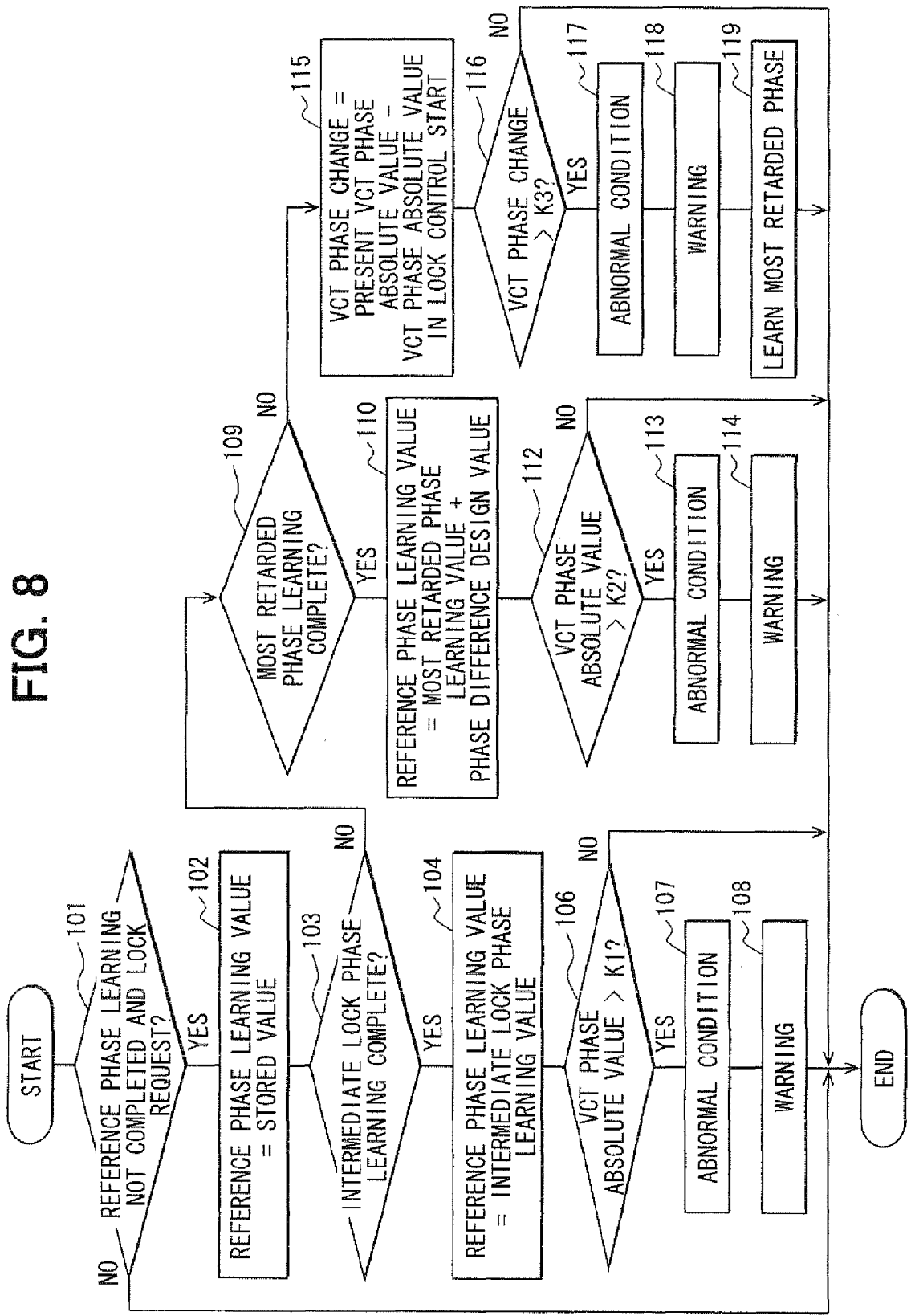
FIG. 8 is a flow chart explaining an operation of an intermediate-lock-phase-pass-through determination processing according to the second embodiment.

Subsequently, a second embodiment will be described with reference to FIG. 8. An intermediate-lock-phase-pass-through determination processing of FIG. 8 according to the present second embodiment is produced by adding a processing of step 119 subsequently to step 118 of the intermediate-lock-phase-pass-through determination processing of FIG. 7 described in the first embodiment. Other processings than additional step 19 is substantially equivalent to that of the first embodiment. The structure other than additional step 19 is substantially equivalent to that of the first embodiment.

In the present embodiment 2, at step 117, when it is determined that the VCT phase has passed through the intermediate lock phase, and when it is determined to be an abnormal condition in which the lock pin 58 is not normally projected, the processing proceeds to subsequent step 118. At step 118, a driver is warned about an abnormal condition promptly by lighting of the warning lamp 70 and/or the like. At subsequent step 119, the most retarded phase is learned as a reference phase. Thus, the learned most retarded phase is stored in the backup RAM and updated.

In this manner, in an abnormal condition, in which the lock pin 58 is not projected, the most retarded phase can be learned as a reference phase. Thus, the VCT phase can be controlled by setting the learning value of the most retarded phase as the reference phase. At step 119, the most advanced phase may be learned as the reference phase.

Third Embodiment

Subsequently, a third embodiment will be described with reference to FIGS. 9, 10. Description of the same portion as that of the first embodiment will be omitted or simplified, and a different portion from the first embodiment will be described. In the present third embodiment, a provisional learning operation is performed. In the provisional learning operation, when a lock request occurs in a period in which learning of the reference phase is not completed, one phase is selected from the most retarded phase, the most advanced phase, and the intermediate lock phase, and the selected phase is learned as a provisional reference phase. In this manner, when a lock request occurs before completion of learning of the reference phase, one phase is selected as a provisional reference phase from the most retarded phase, the most advanced phase, and the intermediate lock phase. The provisional reference phase is the easiest to be learned or on the most safety side. Thus, the VCT phase can be controlled at the target phase on the basis of the provisional reference phase.

Specifically, in the provisional learning operation, when a lock request occurs before completion of learning of the reference phase, the present VCT phase is compared with a range of a product variation of each of the most retarded phase, the most advanced phase, and the intermediate lock phase. Thus, one of the most retarded phase, the most advanced phase, and the intermediate lock phase, which has a range of a product variation including the present VCT phase, is selected as the provisional reference phase. In addition, the present VCT phase is stored as a learning value of the provisional reference phase in the backup RAM and the like. After learning of the provisional reference phase through the provisional learning operation, when a reference phase learning start condition is satisfied, learning of the reference phase is performed. Thus, learning of the reference phase is completed.

When a lock request occurs before completion of learning of the reference phase, and when the present VCT phase is not in a range of a product variation of the most retarded phase, the most advanced phase, and the intermediate lock phase, the provisional learning operation is not performed. Thereafter, when a reference phase learning start condition is satisfied, learning of the reference phase is performed, and learning of the reference phase is completed.

In this case, when the reference phase learning start condition is satisfied, a phase, which is the easiest to learn or on the safest side, may be selected from the most retarded phase, the most advanced phase, and the intermediate lock phase, according to an engine operation condition. Thus, the selected phase may be learned as the reference phase.

Figure 9:
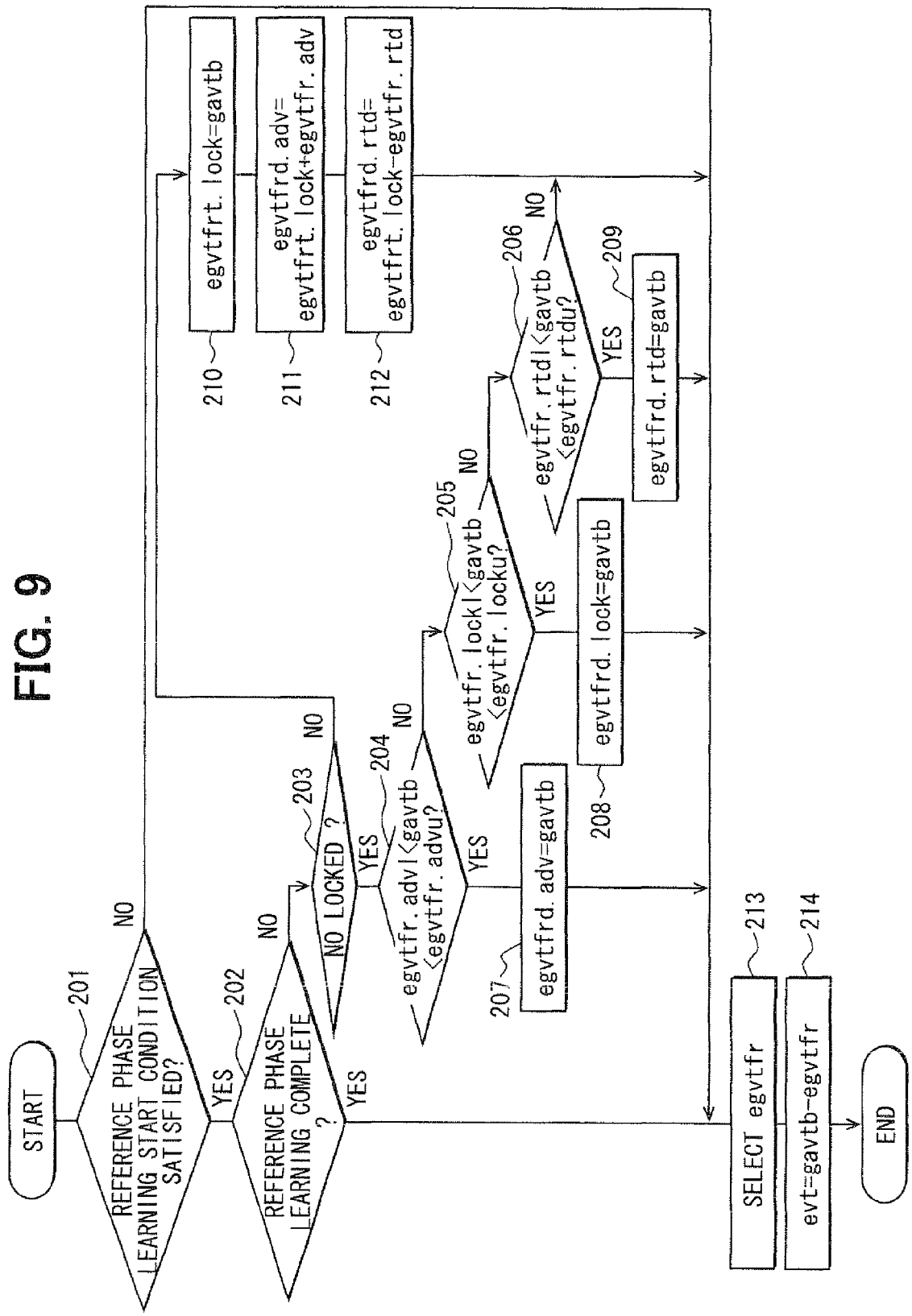
FIG. 9 is a flowchart explaining an operation of a reference phase learning processing according to the embodiment.
Figure 10:
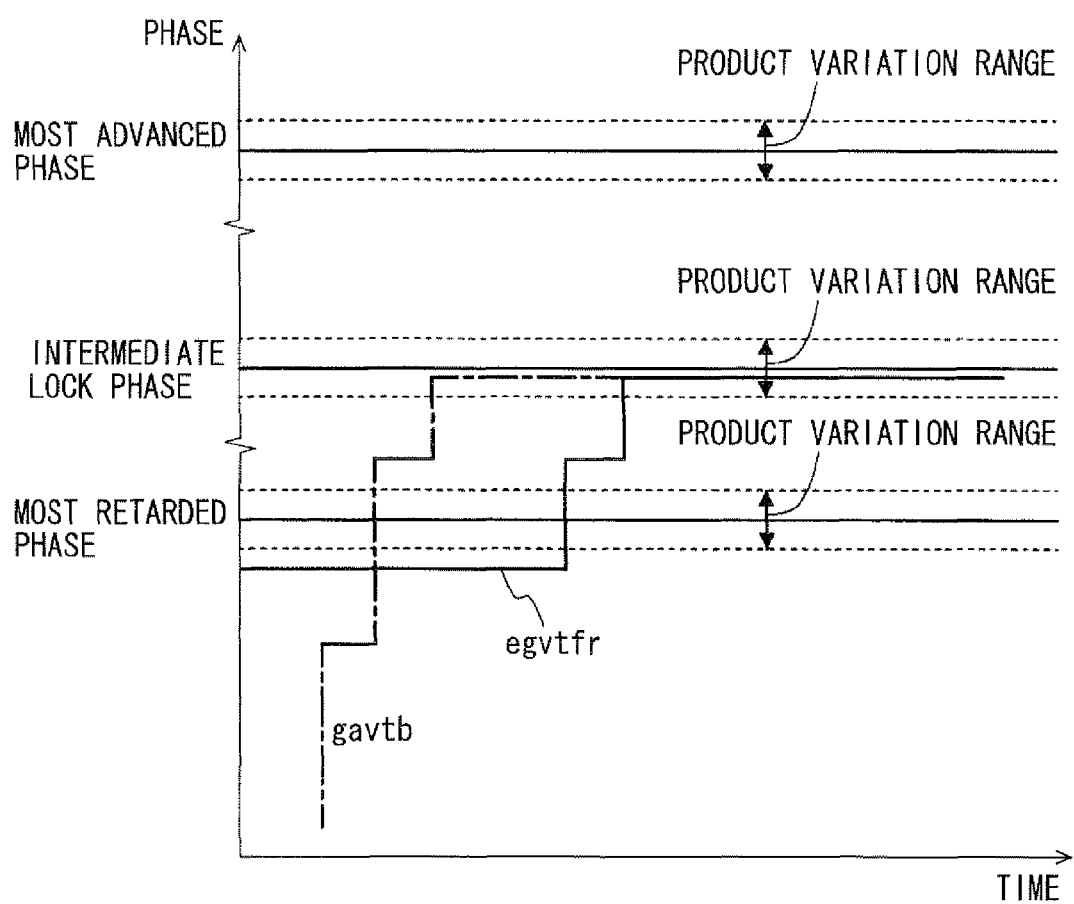
FIG. 10 is an explanatory view explaining a learning method of the reference phase according to the third embodiment.

The reference phase learning processing of FIG. 9 is repeatedly executed at a predetermined interval in a period in which the engine control circuit 21 is supplied with electric power and activated after the ignition switch is turned ON (activated). The reference phase learning processing of FIG. 9 functions as a reference phase learning unit.

When the present processing is activated, at step 201, it is first determined whether a lock request has occurred and whether a reference phase learning start condition is satisfied. When the reference phase learning start condition is satisfied, the processing proceeds to step 202. At step 202, it is determined whether learning of the reference phase is completed. When learning of the reference phase is determined to be completed at step 202, the processing proceeds to step 213. At step 213, a learning value egvtfr, which is most suitable for the engine operation condition, is selected from a reference phase learning value stored in the backup RAM. The stored reference phase learning value is at least one learning value of the most retarded phase, the most advanced phase, and the intermediate lock phase. Subsequently, the processing proceeds to step 214. At step 214, a present VCT phase relative value evt is calculated by subtracting the reference phase learning value egvtfr from the present VCT phase absolute value gavtb.

$$evt = gavtb - egvtfr$$

On the other hand, when it is determined that learning of the reference phase is not completed at step 202, the processing proceeds to step 203. At step 203, it is determined whether the VCT phase is locked in the intermediate lock phase. When it is determined that the VCT phase is not locked in the intermediate lock phase, the processing proceeds to step 204. At step 204, it is determined whether the present VCT phase absolute value gavtb is between a lower limit egvtfr.advl of a range of a product variation of the most advanced phase and an upper limit egvtfr.advu of the range of the product variation of the most advanced phase. When it is determined that the present VCT phase absolute value gavtb is between the limits egvtfr.advl–egvtfr.advu of the range of the product variation of the most advanced phase, the processing proceeds to step 207. At step 207, the present VCT phase absolute value gavtb is learned as a provisional most advanced phase learning value egvtfrd.adv. The learned provisional most advanced phase learning value egvtfrd.adv is stored in the backup RAM and updated.

On the other hand, at step 204, when it is determined that the present VCT phase absolute value gavtb is not between the limits egvtfr.advl–egvtfr.advu of the product variation of the most advanced phase, the processing proceeds to step 205. At step 205, it is determined whether the present VCT phase absolute value gavtb is between a lower limit egvtfr.lockl of a product variation of an intermediate lock phase and an upper limit egvtfr.locku of the product variation of the intermediate lock phase. When it is determined that the present VCT phase absolute value gavtb is between the limits egvtfr.lockl–egvtfr.locku of the range of the product variation of the intermediate lock phase, the processing proceeds to step 208. At step 208, the present VCT phase absolute value gavtb is learned as a provisional intermediate lock phase learning value egvtfrd.lock. The learned provisional intermediate lock phase learning value egvtfrd.lock is stored in the backup RAM and updated. In the example of FIG. 10, the intermediate lock phase learning value egvtfrd.lock is learned.

On the other hand, at step 205, when it is determined that the present VCT phase absolute value gavtb is not between the limits egvtfr.lockl–egvtfr.locku of the product variation of the intermediate lock phase, the processing proceeds to step 206. At step 206, it is determined whether the present VCT phase absolute value gavtb is between a lower limit egvtfr.rtdl of a product variation of a most retarded phase and an upper limit egvtfr.rtdu of the product variation of the most retarded phase. When it is determined that the present VCT phase absolute value gavtb is between the limits egvtfr.rtdl–egvtfr.rtdu of the range of the product variation of the most retarded phase, the processing proceeds to step 209. At step 209, the present VCT phase absolute value gavtb is learned as a provisional most retarded phase learning value egvtfrd.rtd. The learned provisional most retarded phase learning value egvtfrd.rtd is stored in the backup RAM and updated.

At step 206, when it is determined that the present VCT phase absolute value gavtb is not between the limits egvtfr.rtdl–egvtfr.rtdu of the product variation of the most retarded phase, learning of the provisional reference phase is not performed.

On the other hand, at the step 203, when it is determined that the VCT phase is locked in the intermediate lock phase, the processing proceeds to step 210. At step 210, the present VCT phase absolute value gavtb is learned as the intermediate lock phase learning value egvtfrt.lock. The learned intermediate lock phase learning value egvtfrt.lock is stored in the backup RAM and updated. Subsequently, the processing proceeds to step 211. At step 211, the most advanced phase learning value egvtfr.adv, which is stored in the backup RAM, is added to the intermediate lock phase learning value egvtfrt.lock to update the stored most advanced phase learning value egvtfrd.adv.

$$egvtfrd.adv = egvtfrt.lock + egvtfr.adv$$

At subsequent step 212, the most retarded phase learning value egvtfrd.rtd, which is stored in the backup RAM, is subtracted from the intermediate lock phase learning value egvtfrt.lock, and the stored most retarded phase learning value egvtfr.rtd is updated.

$$egvtfrd.rtd = egvtfrt.lock - egvtfr.rtd$$

As described above, after updating the most advanced phase learning value egvtfrd.adv, the intermediate lock phase learning value egvtfrd.lock, and the most retarded phase learning value egvtfrd.rtd at steps 207 to 212, the processing proceeds to step 213. At step 213, the learning value egvtfr, which is most suitable for the engine operation condition, is selected from the reference phase learning value stored in the backup RAM. The stored reference phase learning value is at least one learning value of the most retarded phase, the most advanced phase, and the intermediate lock phase. Subsequently, the processing proceeds to step 214. At step 214, the present VCT phase relative value evt is calculated by subtracting the reference phase learning value egvtfr from the present VCT phase absolute value gavtb.

At step 201, when it is determined that the reference phase learning start condition is not satisfied, the processing skips steps 202 to 212 and proceeds to step 213. At step 213, the learning value egvtfr, which is most suitable for the engine operation condition, is selected from the reference phase learning value stored in the backup RAM. The stored reference phase learning value is at least one learning value of the most retarded phase, the most advanced phase, and the intermediate lock phase. At step 214, the present VCT phase relative value evt is calculated.

According to the present third embodiment, when a lock request occurs before completion of learning of the reference phase, the present VCT phase is compared with the range of the product variation of each of the most retarded phase, the most advanced phase, and the intermediate lock phase. Thus, one of the most retarded phase, the most advanced phase, and the intermediate lock phase, which has a range of a product variation including the present VCT phase, is selected as the provisional reference phase. In addition, the present VCT phase is stored as a learning value of the provisional reference phase. Therefore, when a lock request occurs before completion of learning of the reference phase, the provisional reference phase can be learned easily and immediately.

In addition, when the reference phase learning start condition is satisfied, one phase is selected from the most retarded phase, the most advanced phase, and the intermediate lock phase based on the engine operation condition, and the selected one phase is learned as the reference phase. In this manner, one phase, which is the easiest to learn, or one phase, which is on the safest side (most safe side), can be selected from the most retarded phase, the most advanced phase, and the intermediate lock phase, in accordance with an engine operation condition. Thus, the selected one phase can be learned.

The present invention is not limited to the first to third embodiments. For example, a hydraulic pressure control valve for performing the VCT phase control to control a hydraulic pressure so as to manipulate the VCT phase may be provided separately from a hydraulic pressure control valve for performing the lock control to control a hydraulic pressure so as to manipulate the lock pin 58

In the first to third embodiments, one characteristic structure of the present invention is applied to the variable valve timing control apparatus for an intake valve. The one characteristic structure of the present invention may be applied to a variable valve timing control apparatus for an exhaust valve. When the one characteristic structure of the present invention is applied to a variable valve timing control apparatus for an exhaust valve, it suffices to set the control direction of the VCT phase in the case of an intake valve to be opposite in the case of the exhaust valve. That is, in the case of the exhaust valve, it suffices to oppositely set the relationship between the advance and the retard in the description of the case of the intake valve.

The structure of the variable valve timing device 18, the structure of the hydraulic pressure control valve 25, and the like may be arbitrarily modified.

Summarizing the above embodiments, a variable valve timing device for an internal combustion engine, the variable valve timing device driven by a hydraulic pressure and configured to change a rotation phase (henceforth "VCT phase") of a camshaft relative to a crankshaft to control a valve timing, variable valve timing device includes i) a lock pin configured to lock the VCT phase in an intermediate lock phase, which is located between a most retarded phase and a most advanced phase of a controllable range and ii) a hydraulic pressure control device configured to control a hydraulic pressure to drive the variable valve timing device and the lock pin. A crank angle sensor is configured to generate a crank angle signal for each predetermined crank angle with an operation of the internal combustion engine. A cam angle sensor is configured to generate a cam angle signal for each predetermined cam angle with an operation of the internal combustion engine. A variable valve timing control apparatus for the internal combustion engine is configured to control the hydraulic pressure control device to project the lock pin to lock the VCT phase in the intermediate lock phase when a lock request occurs. The variable valve timing control apparatus includes:

a VCT phase calculating unit configured to calculate the VCT phase based on a phase difference between a time point, in which the crank angle signal is generated, and a time point, in which the cam angle signal is generated;

a reference phase learning unit configured to learn a most retarded phase, a most advanced phase, and an intermediate lock phase, as a reference phase;

a VCT phase control unit configured to set a target phase according to the learning value of the reference phase and configured to control the hydraulic pressure control device such that the VCT phase coincides with the target phase; and a lock abnormality monitor unit configured to monitor a change in the VCT phase; and determine that the VCT phase has passed through the intermediate lock phase when the lock request occurs in a period before the reference phase learning unit completes learning of the reference phase and the monitored change in the VCT phase becomes greater than a threshold. The threshold is set to be greater than a design value of a phase difference between the intermediate lock phase and one of the most retarded phase and the most advanced phase by a range of a product variation of the phase difference. That is, the threshold is set to be greater than a sum of i) a design value of a phase difference between the intermediate lock phase and one of the most retarded phase and the most advanced phase and ii) a range of a product variation of the phase difference.

In the present structure, even in a period before completion of learning of the reference phase, the change in the VCT phase can be correctly calculated based on the crank angle signal and the cam angle signal. In consideration of such a premise, in the present structure, when a lock request occurs before completion of learning of the reference phase, the lock abnormality monitor unit monitors a change in the VCT phase and determines that the VCT phase passes through the intermediate lock phase when the change in the VCT phase becomes greater than the threshold. It is noted that, the threshold is set to be greater than the design value of the phase difference between the intermediate lock phase and one of the most retarded phase and the most advanced phase by the range of the product variation of the phase difference. Therefore, it can be correctly determined whether the VCT phase passes through the intermediate lock phase according to a determination whether the change in the VCT phase becomes greater than the threshold.

In this case, the change in the VCT phase compared with the threshold may be a change in the VCT phase from a start of a clanking operation, for example. When the change in the VCT phase after an occurrence of the lock request becomes greater than the threshold, it may be determined that the VCT phase has passed through the intermediate lock phase, and it may be determined to be an abnormal condition in which the lock pin is not normally projected. In short, when the change in the VCT phase in a lock control, which is to project the lock pin, becomes greater than the threshold, a determination that the VCT phase has passed through the intermediate lock phase without normal projection of the lock pin in the lock control can be made. Therefore, such an abnormal condition, in which the lock pin is not normally projected, can be promptly detected.

When the lock abnormality monitor unit determines that it is the abnormal condition, in which the lock pin is not normally projected, the VCT phase cannot be locked in the intermediate lock phase. Therefore, the intermediate lock phase cannot be learned as the reference phase. Therefore, when the lock abnormality monitor unit determines that it is the abnormal condition, in which the lock pin is not normally projected, one of the most retarded phase and the most advanced phase may be learned as the reference phase. In this manner, the VCT phase is controllable by setting the learning value of the one of the most retarded phase and the most advanced phase to the reference phase. In general, in a variable valve timing control apparatus for an intake valve, it suffices to learn the most retarded phase as the reference phase. Alternatively, in a variable valve timing control apparatus for an exhaust valve, it suffices to learn the most advanced phase as the reference phase.

When the lock abnormality monitor unit determines that it is the abnormal condition, in which the lock pin is not normally projected, a warning unit may warn a driver about the abnormal condition. In this manner, when the abnormal condition occurs, and the lock pin is not projected in the lock control, a driver can be promptly warned about the abnormal condition.

A provisional learning operation may be performed. Specifically, in the provisional learning operation, when a lock request occurs in a period in which learning of the reference phase is not completed, one phase is selected from the most retarded phase, the most advanced phase, and the intermediate lock phase, and the selected phase is learned as the provisional reference phase. In this manner, when the lock request occurs before completion of learning of the reference phase, one phase is selected as the provisional reference phase from the most retarded phase, the most advanced phase, and the intermediate lock phase. The provisional reference phase is the easiest to be learned or on the most safety side. Thus, the VCT phase can be controlled at the target phase on the basis of the provisional reference phase.

Specifically, when the lock request occurs in a period in which learning of the reference phase is not completed, the present VCT phase is compared with the range of the product variation of each of the most retarded phase, the most advanced phase, and the intermediate lock phase. Thus, one of the most retarded phase, the most advanced phase, and the intermediate lock phase, which has the range of the product variation in which the present VCT phase exists, is selected as the provisional reference phase. In addition, the present VCT phase may be stored as the learning value of the provisional reference phase. In this manner, when the lock request occurs in the period in which learning of the reference phase is not completed, the provisional reference phase can be learned easily and immediately.

After learning of the provisional reference phase through the provisional learning operation, when a reference phase learning start condition is satisfied, learning of the reference phase may be performed. Thus, learning of the reference phase can be completed.

When the lock request occurs in the period in which learning of the reference phase is not completed, and when the present VCT phase does not exist in the range of the product variation of the most retarded phase, the most advanced phase, and the intermediate lock phase, the provisional learning operation is not performed. Thereafter, when the reference phase learning start condition is satisfied, learning of the reference phase is performed, and learning of the reference phase is completed.

When the reference phase learning start condition is satisfied, one phase may be selected from the most retarded phase, the most advanced phase, and the intermediate lock phase based on the operating condition of the internal combustion engine, and the selected one phase may be learned as the reference phase. In this manner, one phase, which is easiest to learn or on the most safety side, can be selected from the most retarded phase, the most advanced phase, and the intermediate lock phase, according to the operating condition of the internal combustion engine, and the selected phase can be learned.

The above structures of the embodiments can be combined as appropriate. The above processings such as calculations and determinations are not limited being executed by the engine control circuit 21. The control unit may have various structures including the engine control circuit 21 shown as an example. The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated. It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A variable valve timing control apparatus for a variable valve timing device for an internal combustion engine, the variable valve timing device driven by a hydraulic pressure and configured to change a VCT phase of a camshaft relative to a crankshaft to control a valve timing, the variable valve timing device including i) a lock pin configured to lock the VCT phase in an intermediate lock phase between a most retarded phase and a most advanced phase of a controllable range and ii) a hydraulic pressure control device configured to control a hydraulic pressure to drive the variable valve timing device and the lock pin, the variable valve timing control apparatus configured to control the hydraulic pressure control device to project the lock pin to lock the VCT phase in the intermediate lock phase when a lock request occurs, the variable valve timing control apparatus comprising:
a VCT phase calculating unit configured to calculate the VCT phase based on a phase difference between a time point, in which a crank angle sensor generates a crank angle signal at a predetermined crank angle with an operation of the internal combustion engine, and a time point, in which a cam angle sensor generates a cam angle signal at a predetermined cam angle with the operation of the internal combustion engine;
a reference phase learning unit configured to learn one of the most retarded phase, the most advanced phase, and the intermediate lock phase, as a reference phase;

a VCT phase control unit configured to set a target phase according to a learning value of the reference phase and configured to control the hydraulic pressure control device such that the VCT phase coincides with the target phase; and a lock abnormality monitor unit configured to monitor a change in the VCT phase and determine that the VCT phase has passed through the intermediate lock phase when i) the lock request occurs in a period before the reference phase learning unit completes learning of the reference phase, and ii) the monitored change in the VCT phase becomes greater than a threshold, wherein the threshold is set to be greater than a sum of i) a design value of a phase difference between the intermediate lock phase and one of the most retarded phase and the most advanced phase and ii) a range of a product variation of the phase difference, when the change in the VCT phase after the lock request occurs becomes greater than the threshold, i) the lock abnormality monitor unit determines that the VCT phase has passed through the intermediate lock phase, and ii) the lock abnormality monitor unit determines that it is an abnormal condition, in which the lock pin is not normally projected.

2. The variable valve timing control apparatus according to claim 1, wherein when the lock abnormality monitor unit determines that it is the abnormal condition, the reference phase learning unit learns one of the most retarded phase and the most advanced phase as the reference phase.

3. The variable valve timing control apparatus according to claim 1, further comprising:

a warning unit configured to warn a driver about the abnormal condition when the lock abnormality monitor unit determines that it is the abnormal condition.

4. The variable valve timing control apparatus according to claim 1, wherein when the lock request occurs in a period in which learning of the reference phase is not completed, the reference phase learning unit is configured to perform a provisional learning operation to i) select one phase from the most retarded phase, the most advanced phase, and the intermediate lock phase and ii) learn the selected one phase as a provisional reference phase.

5. The variable valve timing control apparatus according to claim 4, wherein when the lock request occurs in the period in which learning of the reference phase is completed, the reference phase learning unit is configured to i) compare a present VCT phase with a range of a product variation of each of the most retarded phase, the most advanced phase, and the intermediate lock phase, ii) select one phase as the provisional reference phase from the most retarded phase, the most advanced phase, and the intermediate lock phase, the selected one phase having the range of the product variation including the present VCT phase, and iii) store the present VCT phase as a learning value of the provisional reference phase.

6. The variable valve timing control apparatus according to claim 5, wherein when a reference phase learning start condition is satisfied after learning the provisional reference phase through the provisional learning operation, the reference phase learning unit is configured to learn the reference phase and complete learning of the reference phase.

7. The variable valve timing control apparatus according to claim 5, wherein in a certain condition in which i) the lock request occurs in the period in which learning of the reference phase is not completed, and ii) the present VCT phase is not included in the range of the product variation of the maximum retard phase, the maximum advance phase, and the intermediate lock phase, the reference phase learning unit is configured not to perform the provisional learning operation, and when a reference phase learning start condition is satisfied after the certain condition, the reference phase learning unit is configured to learn the reference phase and complete learning of the reference phase.

8. The variable valve timing control apparatus according to claim 4, wherein the reference phase learning unit is configured to select one phase from the most retarded phase, the most advanced phase, and the intermediate lock phase based on an operating condition of the internal combustion engine, and when a reference phase learning start condition is satisfied, the reference phase learning unit is configured to learn the selected one phase as the reference phase.

9. A method for controlling a variable valve timing device for an internal combustion engine, the variable valve timing device driven by a hydraulic pressure to change a VCT phase of a camshaft relative to a crankshaft to control a valve timing, the variable valve timing device including i) a lock pin to lock the VCT phase in an intermediate lock phase between a most retarded phase and a most advanced phase of a controllable range and ii) a hydraulic pressure control device to control a hydraulic pressure to drive the variable valve timing device and the lock pin, the method comprising:

calculating the VCT phase based on a phase difference between a time point, in which a crank angle sensor generates a crank angle signal at a predetermined crank angle with an operation of the internal combustion engine, and a time point, in which a cam angle sensor generates a cam angle signal at a predetermined cam angle with the operation of the internal combustion engine;

learning one of the most retarded phase, the most advanced phase, and the intermediate lock phase, as a reference phase;

setting a target phase according to a learning value of the reference phase;

controlling the hydraulic pressure control device such that the VCT phase coincides with the target phase;

controlling the hydraulic pressure control device to control the hydraulic pressure to project the lock pin to lock the VCT phase in the intermediate lock phase when a lock request occurs; and monitoring a change in the VCT phase and determining that the VCT phase has passed through the intermediate lock phase when: i) the lock request occurs in a period before completion of the learning of the reference phase; and ii) the monitored change in the VCT phase becomes greater than a threshold, wherein the threshold is set to be greater than a sum of i) a design value of a phase difference between the intermediate lock phase and one of the most retarded phase and the most advanced phase and ii) a range of a product variation of the phase difference, the method further comprising:

determining, when the change in the VCT phase after the lock request occurs becomes greater than the threshold, that i) the VCT phase has passed through the intermediate lock phase, and ii) it is an abnormal condition, in which the lock pin is not normally projected.

10. The method according to claim 9, further comprising:

performing a provisional learning operation to i) select one phase from the most retarded phase, the most advanced phase, and the intermediate lock phase and ii) learn the selected one phase as a provisional reference phase, when the lock request occurs before completion of the learning of the reference phase.

* * * * *